March 12, 1935.　　　J. T. BURNS　　　1,994,209
PIPE CLEANER
Filed April 15, 1932　　2 Sheets-Sheet 1
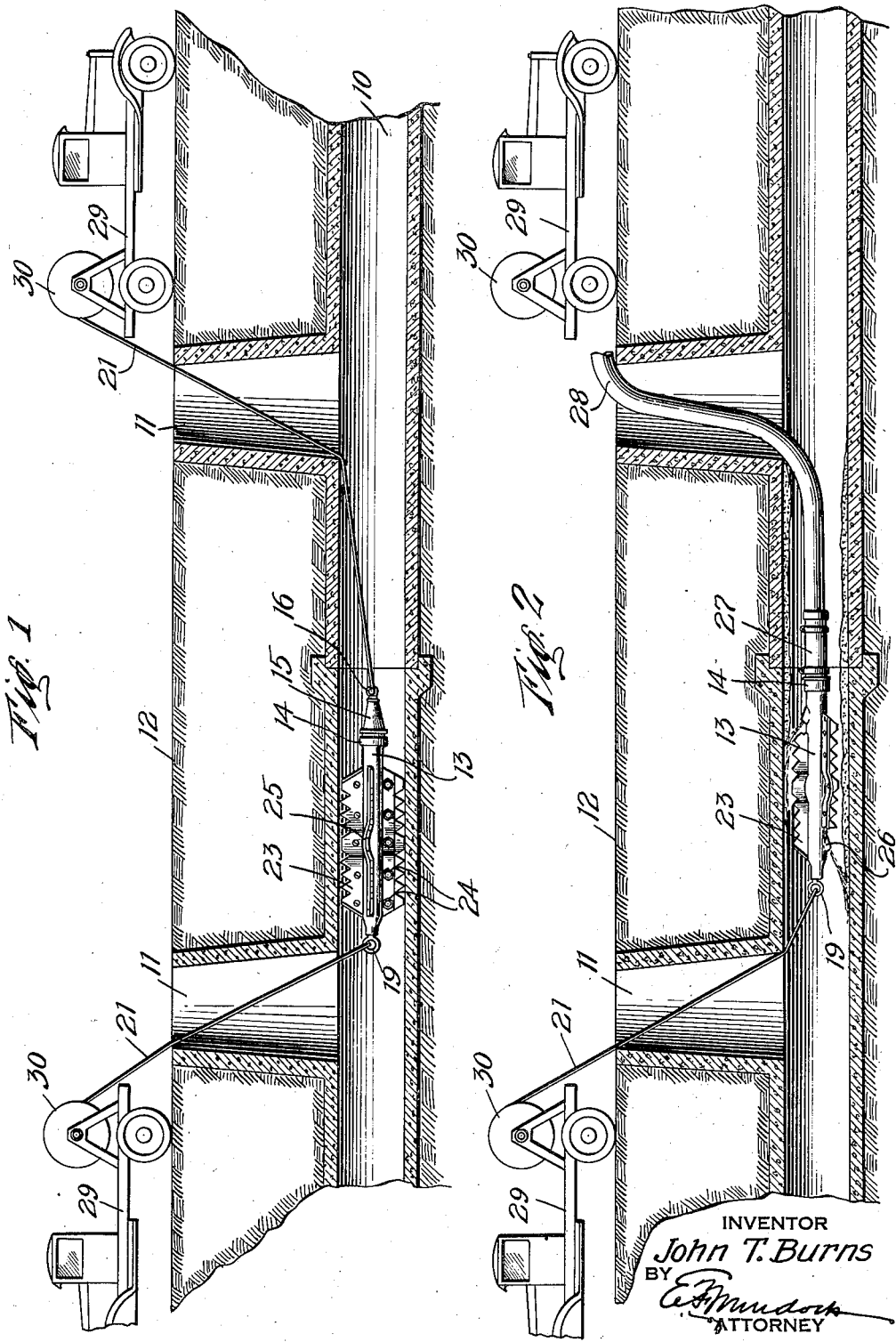
INVENTOR
John T. Burns
BY
ATTORNEY

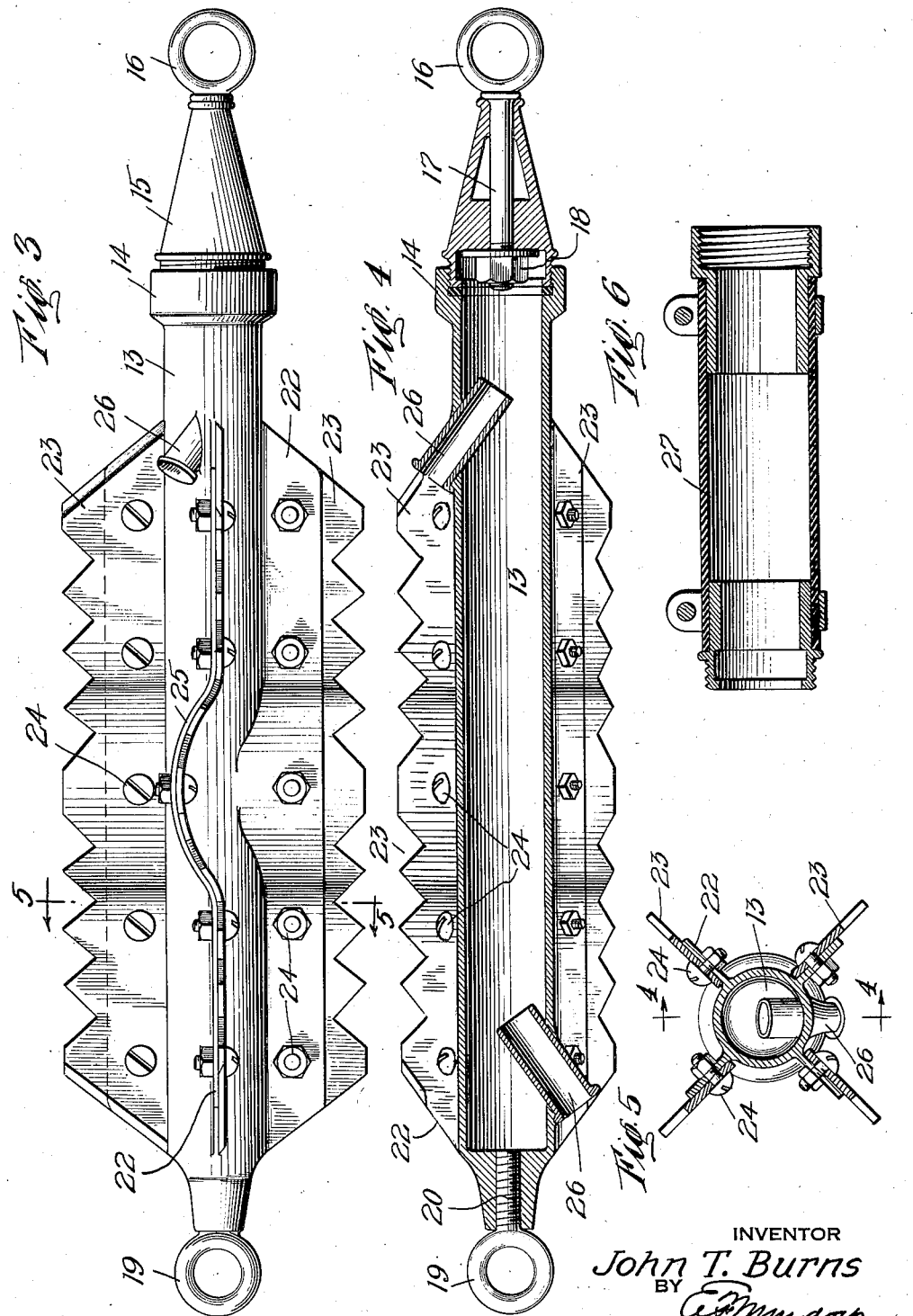

Patented Mar. 12, 1935

1,994,209

UNITED STATES PATENT OFFICE 1,994,209

PIPE CLEANER

John T. Burns, Corona, N. Y.

Application April 15, 1932, Serial No. 605,430

2 Claims. (Cl. 15—104.30)

This invention relates to improvements in pipe cleaners, and more particularly to pipe cleaners for such purposes as cleaning sewer pipes.

Among the principal objects which the invention has in view are: To provide a pipe cleaner which will thoroughly and effectively clean sewer pipes and the like; to positively cut away growth which has gained access through crevices through the pipe or otherwise; to obtain a simultaneous rotary impetus and scraping action with advancement of the cleaner in an obstructed pipe; to render it impossible to pass the cleaner through a pipe without scraping a passage next the wall of the pipe greater than the mere thickness of the blade; to secure equally efficient scraping with operation of the cleaner in either direction; to obtain rotation in the same direction whichever way the cleaner is moved longitudinally; to provide a device which may be used for the entire operation; to provide a device which may be readily adapted to different sizes of pipe; to both sever the growth and wash the same and other foreign matter out of the pipe; to secure simplicity of construction and operation; and to obtain other advantages and results as may be brought out in the following description.

In the drawings:

Figure 1 is a longitudinal sectional view of a sewer construction wherein the invention is shown in use;

Figure 2 is a similar view showing the invention in use for flushing the sewer pipe;

Figure 3 is an elevation of the pipe cleaner;

Figure 4 is a longitudinal sectional view of the same shown as taken on line 4—4 of Figure 5;

Figure 5 is a cross-sectional view of the pipe cleaner shown as taken on the line 5—5 of Figure 4; and Figure 6 is a longitudinal sectional view of the hose coupling.

As seen in the drawings the sewer construction is illustrated as providing a sewer pipe 10 into which manholes 11, 11 extend from the street surface 12 as usual. It will be understood that undesired growths, such as tree roots, very frequently force their way into sewer pipes at inaccessible distances from the manholes. The present invention provides an improved means for removing those growths and also other foreign matter which may have become lodged or deposited in the pipe.

The invention includes a device of elongated nature of a size small enough to be readily moved longitudinally back and forth in the pipe. As here shown said device comprises a tubular body portion 13 having one end thereof closed, and having an annular collar 14 at its other end which is shown as screw-threaded, preferably with interior threads for receiving such fitting as desired to apply thereto. One such fitting is shown in Figures 3 and 4 and comprises a cap 15, the inner end of which is threaded to fit the threads of collar 14 and the outer end of which is provided with suitable attaching means such as the eye 16. If so desired, this eye may be formed as a part of an eye bolt 17 extending longitudinally through the cap with a nut 18 at the inner end thereof. Similarly, the opposite or closed end of the body portion 13 is provided with an attaching means such as eye 19 which also may if desired be a part of a screw eye 20 threaded into an appropriate bore extending longitudinally inward of said body portion. By this means it will be observed, the body portion may be attached at either or both ends and consequently pulled either way in use.

It will be understood by those skilled in the art, that the device is inserted in a sewer pipe and connected by cable at opposite ends, such as cables 21, 21 shown in Figure 1. Various methods are known in the art for getting a cable from one manhole to another, and no special showing thereof is deemed necessary. Suffice it to say that if so desired, the body portion 13 may be lowered through one manhole and pushed to the next manhole by sectional rods secured to said device and to each other while being fed into the pipe. When the device reaches the second manhole the cable is attached and the device then drawn back by means of the sectional rods to the first manhole. Upon getting back to the first manhole, said device is separated from the sectional rods and cap fitting 17 is then applied together with its accompanying cable 21. Any other desired method may be employed as found desirable or necessary.

The body portion 13 is provided with a plurality of longitudinal fins 22 projecting substantially radially from the body portion. In the present showing there are four such fins symmetrically placed and similar each to the other. They are, accordingly, arranged one substantially in diametric opposition to the other in pairs, the pairs being perpendicular to each other. These fins are, in conjunction with the body portion so proportioned that they will not extend the full diameter of the pipe to be cleaned. This fact has advantage in enabling the device to be passed through the pipe by hand as above described before acting to remove the growth within the pipe.

I provide blades 23 to each extend substantially the length of a fin next the longitudinal radial concave side thereof and mounted to have its longitudinal face juxtaposed to said longitudinal radial face of the fin for support thereby. The fins and blades are correspondingly perforated to receive bolts 24 constituting a means for removably attaching the blades to the fins. The depth of the blades may be proportioned in conjunction with the diameter of the body portion of the device to bring the longitudinal outer edges of the blades near enough to the inside wall surface of the pipe 10 for obtaining the desired cutting action upon the growth within the pipe. Preferably the longitudinal edges of said blades are notched to provide saw teeth, and by working the device back and forth in the pipe the growth will be severed and consequently readily removed. Different sized blades may be provided thereby enabling the same body portion 13 to be used regardless of the size of the pipe to be cleaned.

Preferably the fins 22 are each provided with end parts longitudinally disposed with respect to the body portion in a common plane, said plane also passing through the axis of the body portion or a line parallel thereto. Intermediate the end parts of the fin, the same provides an intermediate curved part 25 progressively offsetting with respect to each of the longitudinal parts so as to provide substantially a reversed helix or the like. The blade is similarly shaped to rest flatwise against the fin. The forward slope (determined by direction of transition of the cleaner) will engage obstructions in the pipe and thereby obtain a turning movement of the cleaner and a scraping action of the other parts of the blade against the wall of the pipe. The curved part 25 is similar at opposite ends, so the turning movement is effected no matter in which longitudinal direction the cleaner is moved. The rotation however, will be in the same direction. Because of the longitudinal parts and offset part of the blades, the cleaner will scrape the wall of the pipe whether the cleaner is turning or not, and cannot merely feed forward as a screw without a scraping action.

As indicated above, body portion 13 is tubular but closed at one end, and at desired positions on the surface of said body portion may be provided nozzles 26 communicating with the hollow interior of said body portion. These nozzles preferably are directed diagonally somewhat in the direction of the closed end of the body portion. By means of direct attachment or through the agency of a coupling 27, a hose 28 may be attached to body portion 13, it being understood cap 15 is first removed. As the device is pulled by eye 19 through the pipe to be cleaned, jets of water under pressure applied by hose 28 will be directed in the same way as the direction of movement of the device and the jets in conjunction with movement of the device will remove all loosened matter within the pipe. It furthermore will be understood that any suitable means may be used for manipulating the device, and I have indicated trucks 29 with windlasses 30 for this purpose.

I claim:

1. A pipe cleaner as characterized comprising an elongated body portion rotatable about its own longitudinal axis and having means at opposite ends thereof by which said body portion may be drawn in either direction through a pipe to be cleaned, and a plurality of outwardly projecting blades extending substantially the length of said body portion, said blades each having end parts in a common plane and having a curved part intermediate said end parts, said curved part having a curvature progressively offsetting the said intermediate curved part laterally out of said plane from the end parts of the blade, both the longitudinal and curved portions of the blade providing pipe contacting means substantially throughout the length thereof and equidistant from the axis of the body portion, whereby advancing the cleaner in a pipe in either direction obtains the same direction of turning movement by engagement of the leading portion of the progressively offsetting part of the blade with obstructions in the pipe and a lateral scraping action by the rest of the blade.

2. A pipe cleaner as characterized comprising an elongated body portion rotatable about its own longitudinal axis having means at opposite ends thereof by which said body portion may be drawn in either direction through a pipe to be cleaned, a plurality of outwardly projecting longitudinal fins integral with and extending substantially the length of said body portion, and a plurality of blades in flatwise engagement each with a fin and of substantially the same length as the fin, each said fin and its engaging blade having end parts in a common plane and having a curved part intermediate said end parts, said curved part having a curvature progressively offsetting the said intermediate curved part laterally from each end part out of the plane of the said end parts to the middle of the curvature, both the longitudinal and curved portions of the blade providing pipe contacting means substantially throughout the length thereof and equidistant from the axis of the body portion whereby advancing the cleaner in a pipe in either direction normally obtains a turning movement by engagement of the forward curvature of the offsetting part with obstructions in the pipe and a lateral scraping action by the rest of the blade.

JOHN T. BURNS.